(12) United States Patent
Lee et al.

(10) Patent No.: US 11,216,703 B2
(45) Date of Patent: Jan. 4, 2022

(54) AUTOMOTIVE SENSOR INTEGRATION MODULE 100

(71) Applicant: HYUNDAI MOBIS CO., LTD., Seoul (KR)

(72) Inventors: Sang Hun Lee, Yongin-si (KR); Seung Bum Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 105 days.

(21) Appl. No.: 16/726,717

(22) Filed: Dec. 24, 2019

(65) Prior Publication Data

US 2021/0125009 A1  Apr. 29, 2021

(30) Foreign Application Priority Data

Oct. 24, 2019  (KR) .......................... 10-2019-0133134

(51) Int. Cl.
| | |
|---|---|
| *G06K 9/00* | (2006.01) |
| *G06K 9/62* | (2006.01) |
| *H04L 29/08* | (2006.01) |
| *H04Q 9/04* | (2006.01) |
| *G01S 13/86* | (2006.01) |
| *G01S 13/931* | (2020.01) |
| *G01S 7/40* | (2006.01) |

(52) U.S. Cl.
CPC .............. *G06K 9/6288* (2013.01); *G01S 7/40* (2013.01); *G01S 13/865* (2013.01); *G01S 13/867* (2013.01); *G01S 13/931* (2013.01); *H04L 67/12* (2013.01); *H04Q 9/04* (2013.01); *H04Q 2209/845* (2013.01); *H04Q 2209/86* (2013.01)

(58) Field of Classification Search
CPC ...... H04L 67/12; G06K 9/6288; B60K 35/00; G01S 13/865; G01S 13/867; H04N 5/23238; G06T 15/06; G06T 17/20
See application file for complete search history.

(56) References Cited

U.S. PATENT DOCUMENTS

2017/0195564 A1* 7/2017 Appia ................ H04N 5/23238

* cited by examiner

*Primary Examiner* — Phuoc H Doan
(74) *Attorney, Agent, or Firm* — H.C. Park & Associates, PLC

(57) ABSTRACT

An automotive sensor integration module including a plurality of sensors which differ in at least one of a sensing period or an output data format, and a signal processing unit configured to synchronize, when a malfunctioning sensor is detected from among the plurality of sensors, pieces of detection data output from remaining sensors other than the detected sensor to substantially simultaneously output the synchronized data as sensing data.

9 Claims, 8 Drawing Sheets

AUTOMOTIVE SENSOR INTEGRATION MODULE 100

CROSS-REFERENCE TO RELATED APPLICATION

This application claims priority from and the benefit of Korean Patent Application No. 10-2019-0133134, filed on Oct. 24, 2019, which is hereby incorporated by reference for all purposes as if fully set forth herein.

BACKGROUND

Field

Exemplary embodiments relate to an automotive sensor integration module.

Discussion of the Background

As technology becomes more advanced, various sensors, electronic devices, and the like are also provided in a vehicle for user convenience. In particular, research regarding an advanced driver assistance system (ADAS) has been actively conducted for users' driving convenience. Furthermore, the development of autonomous vehicles is actively under way.

The ADAS and the autonomous vehicles require a large number of sensors and electronic devices to identify objects outside a vehicle.

Referring to FIG. 1, in order to detect objects in front of a vehicle, a camera, a lidar, a radar sensor, etc. are disposed in front of the vehicle, but are disposed at different positions respectively.

Although objects should be identified on the basis of detection results detected by sensors at the same timing in order to improve performance in detecting objects, it is not easy to synchronize object detection sensors because the sensors are disposed at different positions.

The above information disclosed in this Background section is only for understanding of the background of the inventive concepts, and, therefore, it may contain information that does not constitute prior art.

SUMMARY

Exemplary embodiments of the present invention provide an automotive sensor integration module in which a plurality of synchronized sensors are arranged.

Additional features of the inventive concepts will be set forth in the description which follows, and in part will be apparent from the description, or may be learned by practice of the inventive concepts.

The inventive concepts of the present invention are not limited to the above-mentioned exemplary embodiments, and other aspects and advantages of the present invention, which are not mentioned, will be understood through the following description, and will become apparent from the embodiments of the present invention. Furthermore, it will be understood that aspects and advantages of the present invention can be achieved by the means set forth in the claims and combinations thereof.

An exemplary embodiment of the present invention provides an automotive sensor integration module including: a plurality of sensors which differ in at least one of a sensing period or an output data format; and a signal processing unit configured to synchronize, when a malfunctioning sensor is detected from among the plurality of sensors, pieces of detection data output from remaining sensors other than the detected sensor to substantially simultaneously output the synchronized data as sensing data.

Another exemplary embodiment of the present invention provides an automotive sensor integration module including: a plurality of sensors including at least one or more among an optical camera, an infrared camera, a radar and a lidar; and a signal processing unit configured to synchronize pieces of detection data input for each sensing period of the plurality of sensors with any one piece among the pieces of detection data, and output the synchronized data as sensing data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
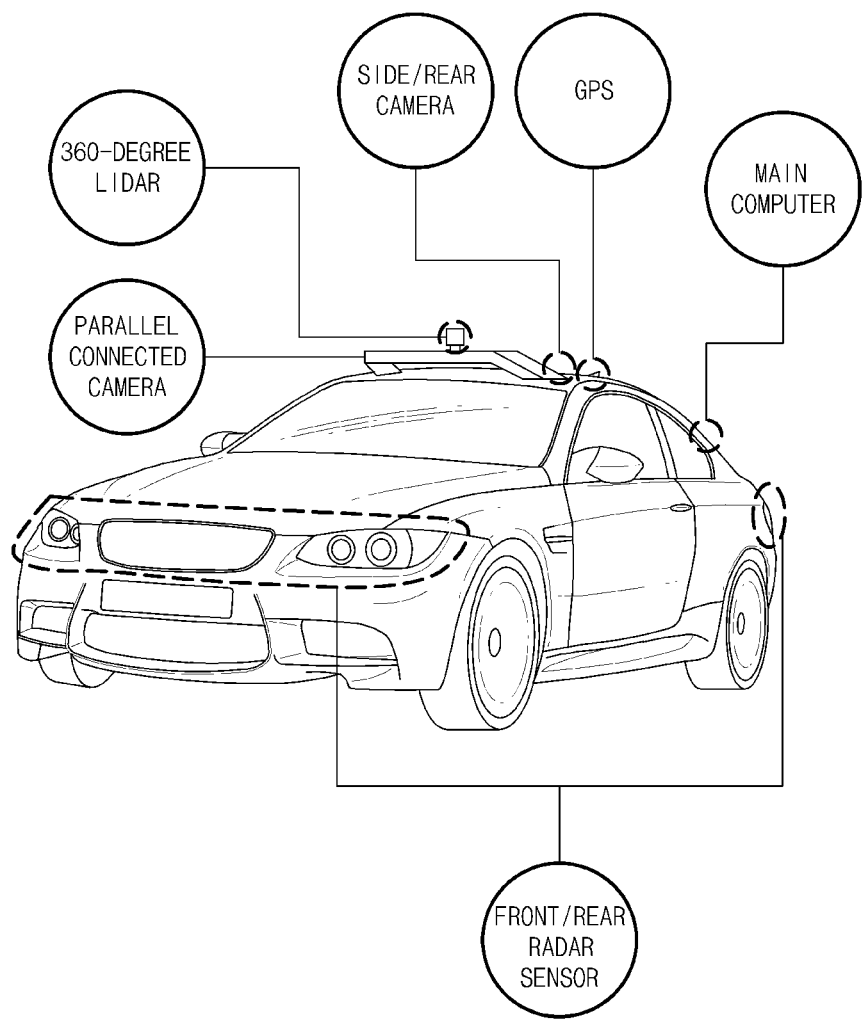
FIG. 1 illustrates external appearance of autonomous vehicle.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
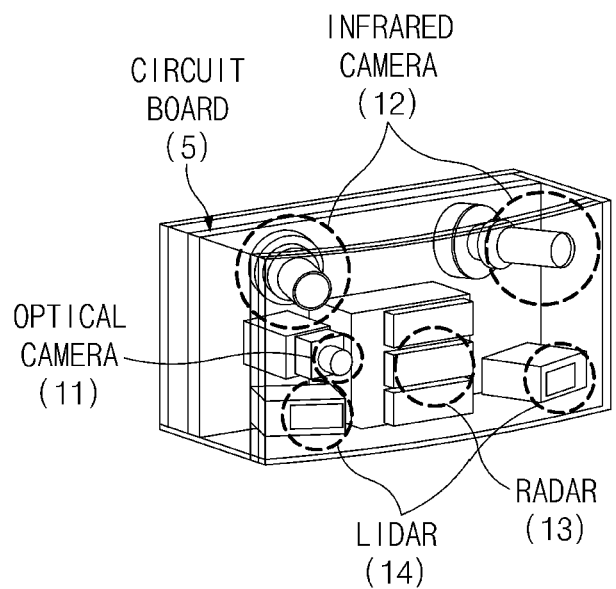
FIG. 2 is an outline drawing of an automotive sensor integration module according to an exemplary embodiment of the present invention.

FIG. 2 is an outside view of an automotive sensor integration module according to an exemplary embodiment of the present invention.

An automotive sensor integration module according to an exemplary embodiment of the present invention may include a plurality of devices and sensors for detecting objects outside a vehicle to acquire safety information related to vehicle driving. In this case, the objects may include a lane, another vehicle, a pedestrian, a two-wheeled vehicle, a traffic signal, light, a road, a structure, a speed bump, a geographical feature, an animal, etc.

The lane may be a driving lane, a lane next to the driving lane, or a lane along which an opposite vehicle travels. The lane may include left and right lines forming a lane.

Another vehicle may be a vehicle that is travelling in the vicinity of a host vehicle. The other vehicle may be a vehicle within a predetermined distance from the host vehicle. For example, the other vehicle may be a vehicle that is located within a predetermined distance from the host vehicle and precedes or follows the host vehicle.

The pedestrian may be a person in the vicinity of a host vehicle. The pedestrian may be a person located within a predetermined distance from the host vehicle. For example, the pedestrian may be a person on a sidewalk or the roadway within a predetermined distance from the host vehicle.

The two-wheeled vehicle may be a vehicle that is located in the vicinity of a host vehicle and moves using two wheels. The two-wheeled vehicle may be a vehicle that has two wheels and is located within a predetermined distance from the host vehicle. For example, the two-wheeled vehicle may include a motorcycle or a bicycle on a sidewalk or the roadway within a predetermined distance from the vehicle.

The traffic signal may include a traffic light, a traffic sign, a pattern or text drawn on a road surface.

The light may include light from a lamp in another vehicle, light from a street lamp, or light emitted from the sun.

The road may include a road surface, a curve, and a slope such as an upward slope or a downward slope.

The structure may be an object which is located around the road and fixed onto the ground. For example, the structure may include a streetlight, a roadside tree, a building, a power pole, a traffic light, a bridge, etc.

The geographical feature may include a mountain, a hill, etc.

Meanwhile, the objects may be classified into a moving object and a stationary object. For example, the moving object may conceptually include another vehicle, a two-wheeled vehicle, a pedestrian, etc., while the stationary object may conceptually include a traffic signal, a road, a structure, etc.

As such, it may be desirable to use various sensors and devices to accurately identify various objects around a vehicle.

In order to accurately identify objects outside a vehicle, an automotive sensor integration module according to an exemplary embodiment of the present invention may include a plurality of different types of sensors and devices. In addition, the automotive sensor integration module according to an exemplary embodiment of the present invention may include at least one sensor and device of the same type.

Figure 3:
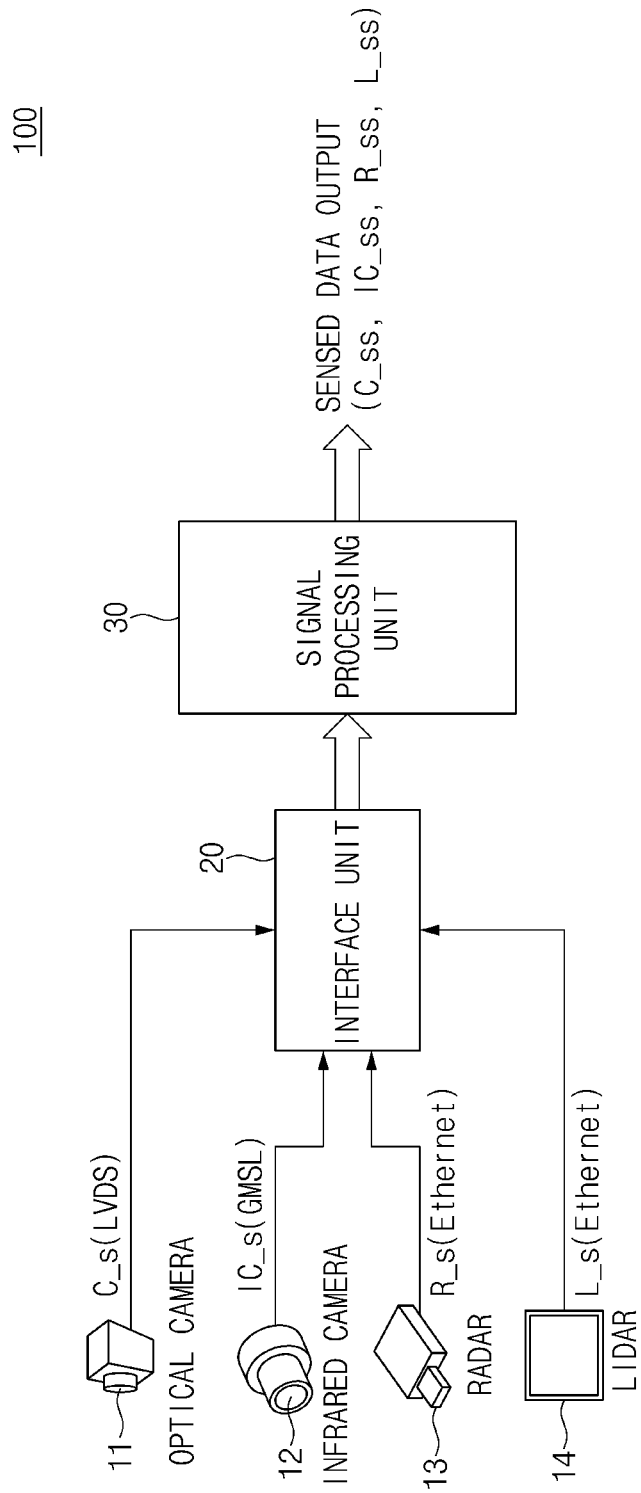
FIG. 3 discloses a configuration of an automotive sensor integration module according to an exemplary embodiment of the present invention.

Referring to FIGS. 2 and 3, the automotive sensor integration module 100 according to an exemplary embodiment of the present invention may include an infrared camera 12, an optical camera 11, a lidar 14, and a radar 13 as a sensor to identify an object outside a vehicle. The automotive sensor integration module 100 according to an exemplary embodiment of the present invention illustrated in FIG. 2 is exemplarily shown to include an infrared camera 12, an optical camera 11, a lidar 14, and a radar 13 as a sensor in order to identify an object, but is not limited thereto. In addition, the automotive sensor integration module 100 according to an exemplary embodiment of the present invention illustrated in FIG. 2 shows two infrared cameras 12, one optical camera 11, two lidar 14s, and one radar 13, but the number of each sensor is suggested only for illustrative purposes and is not limited thereto.

Referring to FIGS. 2 and 3, the automotive sensor integration module 100 according to an exemplary embodiment of the present invention may include a circuit board, an infrared camera 12, a camera 11, a radar 13, and a lidar 14. For example, the automotive sensor integration module 100 according to an exemplary embodiment of the present invention may include a circuit board on which an infrared camera 12, an optical camera 11, a radar 13, and a lidar 14 are disposed and mounted.

The optical camera 11 designed to acquire outside images of a vehicle through light and recognize objects, light, and people around the vehicle may include a mono camera, a stereo camera, an around-view monitoring (AVM) camera, and a 360-degree camera. The optical camera 11 has advantages of being able to detect colors and accurately classify objects compared to other sensors, but has a disadvantage of being affected by environmental factors, such as darkness, backlight, snow, rain, fog, etc.

The radar 13 may detect an object on the basis of a time-of-flight (TOF) method or a phase-shift method through electromagnetic waves, and detect the location of a detected object, the distance to the detected object, and the relative speed. The radar 13 has an advantage of being capable of long distance detection without being affected by environmental factors, such as darkness, snow, rain, fog, etc., but has a disadvantage of failing to detect an object, made of an electromagnetic wave-absorbing material, for example, a steel structure such as a tunnel or a guardrail, and thus, being unable to classify objects.

The lidar 14 may detect an object on the basis of a TOF method or a phase-shift method through laser light, and detect the location of a detected object, the distance to the detected object, and the relative speed. The lidar has advantages of being less affected by environmental factors such as darkness, snow, rain, fog, etc., efficient in long- and short-distance detection due to high resolution, and objects are able to be simply classified, but has a disadvantage of failing to measure the speed of objects immediately.

The infrared camera 12 may acquire outside images of a vehicle through infrared rays. In particular, the infrared camera 12 may acquire outside images of the vehicle even in darkness at night. The infrared camera 12 has advantages of being capable of long distance detection and being capable of distinguishing living things from objects without being affected by environmental factors, such as darkness, snow, rain, fog, etc. but has a disadvantage of being expensive.

As such, in order to accurately classify and identify external objects around a vehicle regardless of environmental factors, the advantages and disadvantages of each sensor must be combined. Therefore, the automotive sensor integration module 100 according to an exemplary embodiment of the present invention discloses a structure in which a plurality of different sensors are all disposed and mounted on a circuit board. In addition, the automotive sensor integration module 100 according to an exemplary embodiment of the present invention may synchronize and output detection results of a plurality of sensors having different operation cycles, thereby having an advantage of classifying and identifying objects more accurately.

FIG. 3 discloses a configuration of an automotive sensor integration module 100 according to an exemplary embodiment of the present invention.

With reference to FIG. 3, the automotive sensor integration module 100 may include an optical camera 11, an infrared camera 12, a radar 13, a lidar 14, an interface unit 20, and a signal processing unit 30. Here, the interface unit 20 and the signal processing unit 30 may be implemented as hardware or software in the circuit board illustrated in FIG. 2.

The optical camera 11 may output information sensed through light as first detection data $C\_s$. The optical camera 11 may output first detection data $C\_s$ for each preset sensing period. For example, the optical camera 11 may output information sensed through light as the first detection data $C\_s$ every 33 ms (30 Hz).

The infrared camera 12 may output information sensed through an infrared ray as second detection data $IC\_s$. The infrared camera 12 may output the second detection data $IC\_s$ for each preset sensing period. For example, the infrared camera 12 may output information sensed through an infrared ray as second detection data IC_s every 33 ms (30 Hz).

The radar 13 may output information sensed through an electromagnetic wave as third detection data R_s. The radar 13 may output third detection data R_s for each preset sensing period. For example, the radar 13 may output information sensed through an electromagnetic wave as the third detection data R_s every 50 ms (20 Hz).

The lidar may output information sensed through laser light as fourth detection data L_s. The lidar 14 may output fourth detection data L_s for each preset sensing period. For example, the lidar 14 may output information sensed through laser light as the fourth detection data L_s every 100 ms (10 Hz).

Here, pieces of detection data C_s, IC_s, R_s, and L_s output from the optical camera 11, the infrared camera 12, the radar 13 and the lidar 14 may have different communication specifications. For example, the first detection data C_s output from the optical camera 11 may be data in a format used in a Low Voltage Differential Signal (LVDS) communication. The second detection data IC_s output from the infrared camera 12 may be data in a format used in a Gigabit Multimedia Serial Link (GMSL) communication. Data output from the radar 13 and the lidar 14 may be data in a format used in Ethernet.

The interface unit 20 may convert different data formats of the first-to-fourth pieces of detection data C_s, IC_s, R_s, and L_s into preset data formats. The interface unit 20 may convert the formats of the first-to-fourth pieces of detection data C_s, IC_s, R_s, and L_s into a data format according to a preset communication technology among vehicle network communication technologies.

Here, the automotive network communication technologies may include a CAN communication, a LIN communication, a Flex-Ray® communication, Ethernet, and so on. For example, the interface unit 20 may convert the first-to-fourth pieces of detection data C_s, IC_s, R_s, and L_s into data according to the Ethernet communication.

The signal processing unit 30 may receive the first-to-fourth pieces of detection data C_s, IC_s, R_s, and L_s of the same format converted by the interface unit 20. The signal processing unit 30 may synchronize, with a preset timing, the first-to-fourth pieces of detection data C_s, IC_s, R_s, and L_s of the same format output from the interface unit 20, and output the synchronized data to the outside of the automotive sensor integration module 100.

For example, the signal processing unit 30 may output, as sensing data C_ss, IC_ss, R_ss, and L_ss, the first-to-fourth pieces of detection data C_s, IC_s, R_s, and L_s at the same timing based on an input timing of one of the first-to-fourth pieces of detection data C_s, IC_s, R_s, and L_s. For more specific example, the signal processing unit 30 may be configured to receive and store the first-to-fourth pieces of detection data C_s, IC_s, R_s, and L_s, and output the stored first-to-fourth pieces of detection data C_s, IC_s, R_s, and L_s as the sensing data C_ss, IC_ss, R_ss, and L_ss, if a preset time PT elapses after the third detection data R_s has been input to the signal processing unit 30.

On the other hand, the signal processing unit 30 may block an output from a malfunctioning or failing sensor or device among the optical camera 11, the infrared camera 12, the radar 13, and the lidar 14 from being provided as the sensing data.

For example, if the optical camera 11 is determined as malfunctioning or failing among the optical camera 11, the infrared camera 12, the radar 13, and the lidar 14, the signal processing unit 30 may output only the second-to-fourth pieces of detection data, IC_s, R_s, and L_s other than the first detection data C_s as the second-to-fourth pieces of sensing data IC_ss, R_ss, and L_ss.

Here, if the respective pieces of detection data C_s, IC_s, R_s, and L_s, of the optical camera 11, the infrared camera 12, the radar 13, and the lidar 14, which are to be input to the signal processing unit 30 for respective sensing periods, are not input thereto at corresponding periods, the signal processing unit 30 may determine that a device or a sensor, from which the input has not been received, malfunctions or fails, and block detection data from the device or sensor, which has been determined as malfunctioning or failing, from being output as the sensing data.

Figure 4:
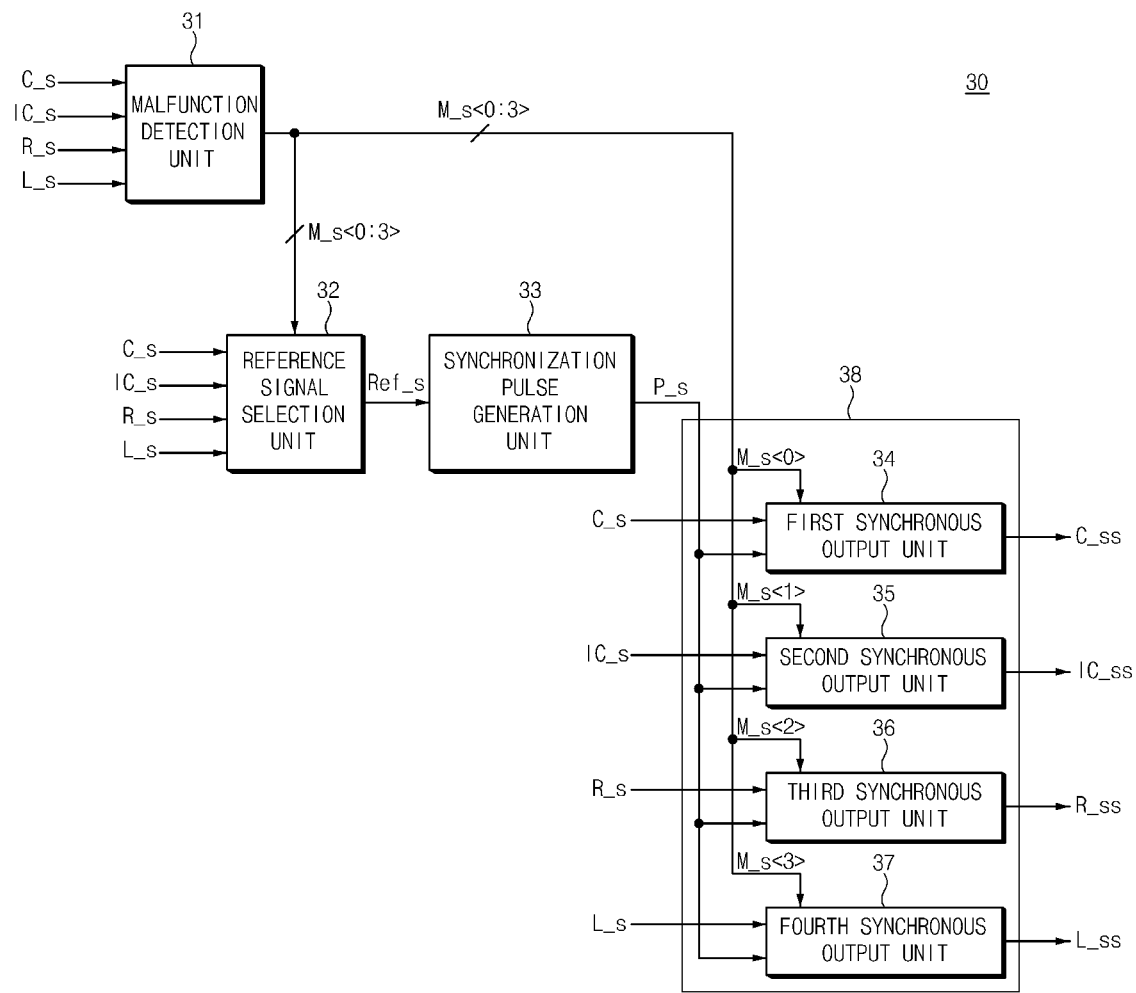
FIG. 4 discloses a configuration of the signal processing unit of FIG. 3.

FIG. 4 discloses a configuration of the signal processing unit illustrated in FIG. 3.

With reference to FIG. 4, the signal processing unit 30 may include a malfunction detection unit 31, a reference signal selection unit 32, a synchronization pulse generation unit 33, and an output synchronization unit 38. Here, the signal processing unit 30 may receive the first-to-fourth pieces of detection data C_s, IC_s, R_s, and L_s of which formats are converted by the interface unit 20.

Hereinafter, although, in the explanation about the signal processing unit 30, the first-to-fourth pieces of detection data C_s, IC_s, R_s and L_s of which formats are converted by the interface unit 20 are simply referred to as first-to-fourth pieces of detection data C_s, IC_s, R_s, and L_s, the first-to-fourth pieces of detection data C_s, IC_s, R_s, and L_s input to the malfunction detection unit 31 and the reference signal selection unit 32, which constitute the signal processing unit 30, are pieces of data of which formats are converted by the interface unit 20.

The malfunction detection unit 31 may determine whether or not each piece of the first-to-fourth pieces of detection data C_s, IC_s, R_s, and L_s is input from each sensor 11, 12, 13, or 14 to the signal processing unit 30, namely, the malfunction unit 31 for each corresponding sensing period.

For example, the malfunction detection unit 31 may check whether the first detection data C_s is input to the malfunction detection unit 31 for every sensing period of the optical camera 11 to determine whether the optical camera 11 malfunctions or fails.

The malfunction detection unit 31 may check whether the second detection data IC_s is input to the malfunction detection unit 31 for every sensing period of the infrared camera 12 to determine whether the infrared camera 12 malfunctions or fails.

The malfunction detection unit 31 may check whether the third detection data R_s is input to the malfunction detection unit 31 for every sensing period of the radar 13 to determine whether the radar 13 malfunctions or fails.

The malfunction detection unit 31 may check whether the fourth detection data L_s is input to the malfunction detection unit 31 for every sensing period of the lidar 14 to determine whether the lidar 14 malfunctions or fails.

The malfunction detection unit 31 may output, as failure codes M_s<0:3>, whether or not each of the optical camera 11, the infrared camera 12, the radar 13, and the lidar 14 malfunctions or fails. Here, the failure codes M_s<0:3> may include a first failure signal M_s<0>, a second failure signal M_s<1>, a third failure signal M_s<2>, and a fourth failure signal M_s<3>.

For example, if the first detection data C_s is input at the sensing period of the optical camera 11, the malfunction detection unit 31 may output the first failure signal M_s<0> at a digital logic low level. On the other hand, if the first detection data C_s is not input at the sensing period of the optical camera 11, the malfunction detection unit 31 may determine the optical camera 11 as malfunctioning or failing, and output the first failure signal M_s<0> at a digital logic high level.

If the second detection data IC_s is input at the sensing period of the infrared camera 12, the malfunction detection unit 31 may output the second failure signal M_s<1> at a digital logic low level. On the other hand, if the second detection data IC_s is not input at the sensing period of the infrared camera 12, the malfunction detection unit 31 may determine the infrared camera 11 as malfunctioning or failing, and output the second failure signal M_s<1> at a digital logic high level.

If the third detection data R_s is input at the sensing period of the radar 13, the malfunction detection unit 31 may output the third failure signal M_s<2> at a digital logic low level. On the other hand, if the third detection data R_s is not input at the sensing period of the radar 13, the malfunction detection unit 31 may determine the radar 13 as malfunctioning or failing, and output the third failure signal M_s<2> at a digital logic high level.

If the fourth detection data L_s is input at the sensing period of the lidar 14, the malfunction detection unit 31 may output the fourth failure signal M_s<3> at a digital logic low level. On the other hand, if the fourth detection data L_s is not input at the sensing period of the lidar 14, the malfunction detection unit 31 may determine the lidar 14 as malfunctioning or failing, and output the fourth failure signal M_s<3> at a digital logic high level.

Accordingly, if at least one or more among the optical camera 11, the infrared camera 12, the radar 13, and the lidar 14 is determined as malfunctioning or failing, the malfunction detection unit 31 may generate and output failure codes M_s<0:3> that have code values corresponding thereto.

The reference signal selection unit 32 may output, as a reference signal Ref_s, any one among the first-to-fourth pieces of detection data C_s, IC_s, R_s, and L_s based on the failure codes M_s<0:3>. For example, the reference signal selection unit 32 may output, as the reference signal Ref_s, detection data corresponding to the failure signal having a digital logic low level among the failure codes M_s<0:3>.

If a failure signal having a digital logic low level is present in plurality among the failure codes M_s<0:3>, the reference signal selection unit 32 may output, as the reference signal Ref_s, detection data determined according to a preset priority. If it is assumed that the preset priority has the order of the third detection data R_s, the first detection data C_s, the second detection data IC_s, and the fourth detection data L_s, the reference signal selection unit 32 may operate in a manner as shown in the following Table 1.

As shown in the above table 1, since the third detection data R_s is the highest in the priority, the reference signal selection unit 32 may output, as the reference signal Ref_s, the third detection data R_s, if the third failure signal M_s<2> is not at a digital logic high level.

If the third failure signal M_s<2> is at the digital logic high level, the reference signal selection unit 32 may output, as the reference signal Ref_s, the first detection data C_s having a lower priority than the third detection data R_s.

In addition, if the first and third failure signals M_s<0> and M_s<2> are both at the digital logic high level, the reference signal selection unit 32 may output, as the reference signal Ref_s, the first detection data C_s having a lower priority than the third detection data R_s.

If the first-to-third failure signals M_s<0> to M_s<2> are all at the digital logic high level, the reference signal selection unit 32 may output, as the reference signal Ref_s, the fourth detection data L_s having the lowest priority. The reference signal selection unit 32 may be simply implemented using a decoder and a multiplexer.

The synchronization pulse generation unit 33 may receive the reference signal Ref_s to output a synchronization pulse P_s. The synchronization pulse generation unit 33 may generate and output the synchronization pulse P_s based on the reference signal Ref_s. For example, if the reference signal Ref_s is input and a preset time PT elapses, the synchronization pulse generation unit 31 may generate and output the synchronization pulse P_s.

The output synchronization unit 38 may receive the first-to-fourth pieces of detection data C_s, IC_s, R_s and L_s, the synchronization pulse P_s, and the failure codes M_s<0:3>, and output the first-to-fourth pieces of sensing data C_ss, IC_ss, R_ss, and L_ss. For example, the output synchronization unit 38 may selectively receive and store the converted first-to-fourth pieces of detection data C_s, IC_s, R_s and L_s provided from the interface unit 20 based on the failure code M_s, and output the stored detection data as the sensing data C_ss, IC_ss, R_ss and L_ss according to the synchronization pulse P_s.

For example, the output synchronization unit 38 may receive and store only detection signals corresponding to failure signals input at a digital logic low level among the failure code M_s<0:3>, and output, as sensing data, the stored detection data according to the synchronization pulse P_s.

The output synchronization unit 38 may include a first synchronous output unit 34, a second synchronous output unit 35, a third synchronous output 36, and a fourth synchronous output unit 37.

The first synchronous output unit 34 may receive the first detection data C_s, the selection pulse P_s and the first failure signal M_s<0>, and output the sensing data C_ss. For

TABLE 1

| 0: Low, 1: High | | | | | | | | | |
|---|---|---|---|---|---|---|---|---|---|
| M_s<0> | M_s<1> | M_s<2> | M_s<3> | Ref_s | M_s<0> | M_s<1> | M_s<2> | M_s<3> | Ref_s |
| 0 | 0 | 0 | 0 | R_s | 1 | 0 | 0 | 0 | R_s |
| 0 | 0 | 0 | 1 | R_s | 1 | 0 | 0 | 1 | R_s |
| 0 | 0 | 1 | 0 | C_s | 1 | 0 | 1 | 0 | IC_s |
| 0 | 0 | 1 | 1 | C_s | 1 | 0 | 1 | 1 | IC_s |
| 0 | 1 | 0 | 0 | R_s | 1 | 1 | 0 | 0 | R_s |
| 0 | 1 | 0 | 1 | R_s | 1 | 1 | 0 | 1 | R_s |
| 0 | 1 | 1 | 0 | C_s | 1 | 1 | 1 | 0 | L_s |
| 0 | 1 | 1 | 1 | C_s | 1 | 1 | 1 | 1 | X | example, if the first failure signal M_s<0> is at a digital logic low level, the first synchronous output unit 34 may be activated. The activated first synchronous output unit 34 may receive and store the first detection data C_s, and output the stored first detection data C_s as the sensing data C_ss based on the synchronization pulse P_s.

On the other hand, if the first failure signal M_s<0> is at a digital logic high level, the first synchronous output unit 34 may be deactivated. The deactivated first synchronization output unit 34 may block the first detection data C_s from being input and stored, and also block the sensing data C_ss from being output.

The second synchronous output unit 35 may receive the second detection data IC_s, the selection pulse P_s and the second failure signal M_s<1>, and output the sensing data IC_ss. For example, if the second failure signal M_s<1> is at a digital logic low level, the second synchronous output unit 35 may be activated. The activated second synchronous output unit 35 may receive and store the second detection data IC_s, and output the stored second detection data IC_s as the sensing data IC_ss based on the synchronization pulse P_s.

On the other hand, if the second failure signal M_s<1> is at a digital logic high level, the second synchronous output unit 35 may be deactivated. The deactivated second synchronization output unit 35 may block the second detection data IC_s from being input and stored, and also block the sensing data IC_ss from being output.

The third synchronous output unit 36 may receive the third detection data R_s, the synchronization pulse P_s and the third failure signal M_s<2>, and output the sensing data R_ss. For example, if the third failure signal M_s<2> is at a digital logic low level, the third synchronous output unit 32 may receive and store the third detection data R_s, and output the stored third detection data R_s as the first sensing data R_ss on the basis of the selection pulse P_s.

On the other hand, if the third failure signal M_s<2> is at a digital logic high level, the second synchronous output unit 36 may be deactivated. The deactivated third synchronization output unit 36 may block the third detection data R_s from being input and stored, and also block the sensing data R_ss from being output.

The fourth synchronous output unit 37 may receive the fourth detection data L_s, the synchronization pulse P_s and the fourth failure signal M_s<3>, and output the sensing data L_ss. For example, if the fourth failure signal M_s<3> is at a digital logic low level, the fourth synchronous output unit 32 may receive and store the fourth detection data L_s, and output the stored fourth detection data L_s as the sensing data L_ss based on the synchronization pulse P_s.

On the other hand, if the fourth failure signal M_s<3> is at a digital logic high level, the fourth synchronous output unit 37 may be deactivated. The deactivated fourth synchronization output unit 37 may block the fourth detection data L_s from being input and stored, and also block the sensing data L_ss from being output.

Here, each of the first-to-fourth synchronous output units 34, 35, 36 and 37 may be configured by including a register.

Figure 5:
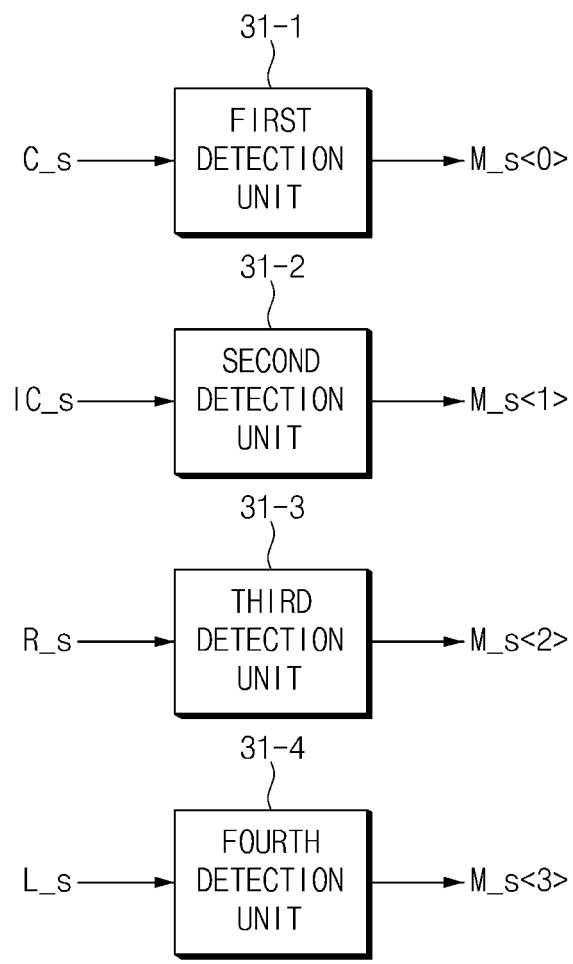
FIG. 5 discloses the malfunction detection unit of FIG. 4.

FIG. 5 discloses the malfunction detection unit of FIG. 4.

As shown in FIG. 5, the malfunction detection unit 31 may include first-to-fourth detection units 31-1, 31-2, 31-3 and 31-4.

If the first detection data C_s is input from the optical camera 11 at the sensing period of the optical camera 11, the first detection unit 31-1 may output the first failure signal M_s<0> at a digital logic low level. On the other hand, if the first detection data C_s is not input at the sensing period of the optical camera 11, the malfunction detection unit 31-1 may determine the optical camera 11 as malfunctioning or failing and output the first failure signal M_s<0> at a digital logic high level.

If the second detection data IC_s is input at the sensing period of the infrared camera 12, the second detection unit 31-2 may output the second failure signal M_s<1> at a digital logic low level. On the other hand, if the second detection data IC_s is not input at the sensing period of the infrared camera 12, the malfunction detection unit 31-2 may output the second failure signal M_s<1> at a digital logic high level If the third detection data R_s is input at the sensing period of the radar 13, the third detection unit 31-3 may output the third failure signal M_s<2> at a digital logic low level. On the other hand, if the third detection data R_s is not input at the sensing period of the radar 13, the third detection unit 31-3 may determine the radar as malfunctioning or failing, and output the third failure signal M_s<2> at a digital logic high level.

If the fourth detection data L_s is input at the sensing period of the lidar 14, the fourth detection unit 31-4 may output the fourth failure signal M_s<3> at a digital logic low level. On the other hand, if the fourth detection data L_s is not input at the sensing period of the lidar 14, the fourth detection unit 31-4 may determine the lidar 14 as malfunctioning or failing, and output the fourth failure signal M_s<3> at a digital logic high level.

The automotive sensor integration module 100 according to an exemplary embodiment of the present invention will be summarized as follows.

As shown in FIG. 3, the first automotive sensor integration module 100 may include a plurality of sensors for detecting an object outside a vehicle, and the plurality of sensors may include the optical camera 11, the infrared camera 12, the radar 13 and the lidar 14. The sensors having different media for sensing the object may output the sensing results in different communication formats.

Here, the automotive sensor integration module 100 according to an exemplary embodiment of the present invention may include the interface unit 20 to convert the detection results of respective sensors, which are output as pieces of data in different communication formats, into pieces of data according to a preset communication format.

In addition, the optical camera 11, the infrared camera 12, the radar 13 and the lidar 14 may have respectively different sensing (operation) periods. For example, the optical camera 11 and the infrared camera 12 may have a 30 Hz sensing period, the radar 12 may have a 20 Hz sensing period, and the lidar 14 may have a 10 Hz sensing period.

In this case, the optical camera 11 and the infrared camera 12 may respectively output the first and second pieces of detection data C_s and IC_s every first time (33 ms), the radar 13 may output the third detection data R_s every second time (50 ms), and the lidar 14 may output the fourth detection data L_s every third time (100 ms).

In order to accurately determine the object outside the vehicle, pieces of detection data detected at the substantially same time from the optical camera 11, the infrared camera 12, the radar 13 and the lidar 14 are necessary. However, as described above, the optical camera 11, the infrared camera 12, the radar 13 and the lidar 14 have respectively different sensing periods and thus, it is difficult to determine the object.

The automotive sensor integration module 100 according an exemplary embodiment of the present invention may include a signal processing unit 30 to synchronize the pieces of detection data from the optical camera 11, the infrared camera 12, the radar 13 and the lidar 14 based on the sensing period of any one of the optical camera 11, the infrared camera 12, the radar 13 and the lidar 14, and output the synchronized detection data.

As a result, the automotive sensor integration module 100 according to an exemplary embodiment of the present invention has advantages in determining the object outside the vehicle. Furthermore, the automotive sensor integration module 100 according to an exemplary embodiment of the present invention may block an output from malfunctioning or failing sensor or device among the optical camera 11, the infrared camera 12, the radar 13, and the lidar 14 from being output as the sensing data.

Figure 6:
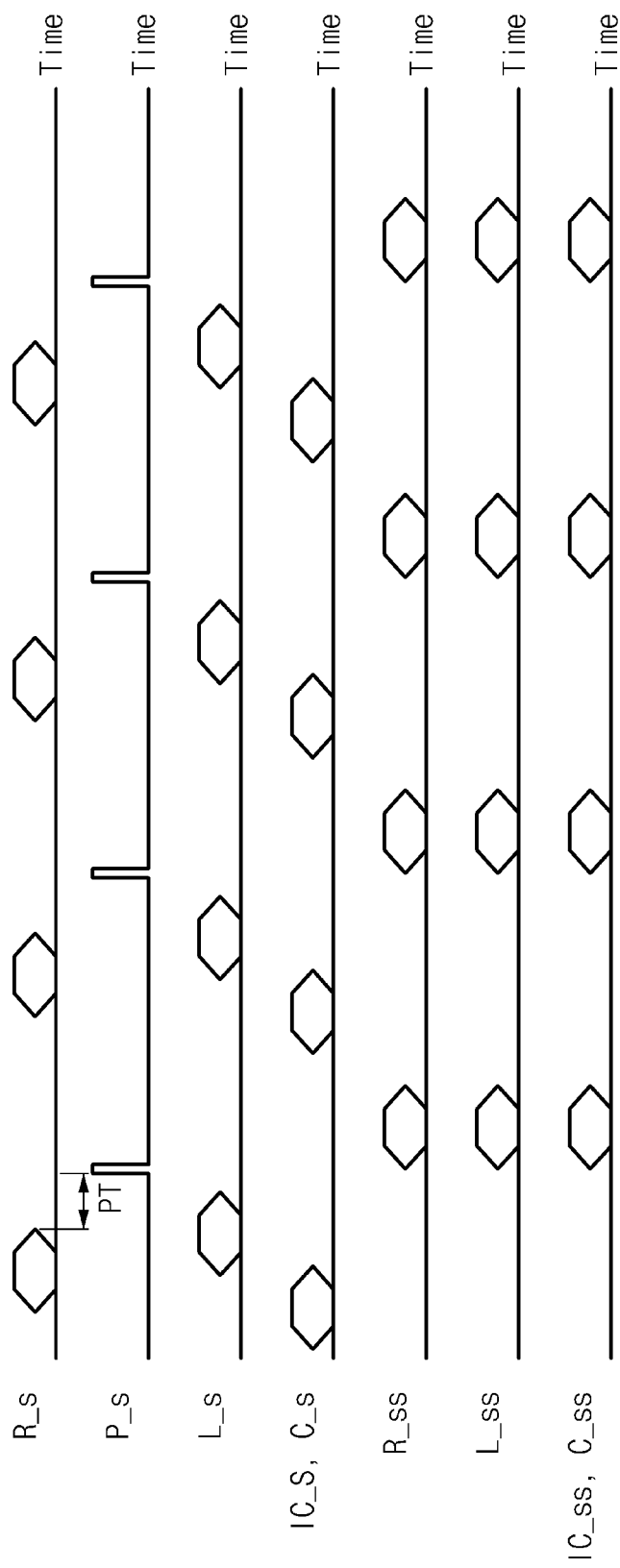
FIG. 6, FIG. 7, and FIG. 8 are timing diagrams for explaining an operation of an automotive sensor integration module according to an exemplary embodiment of the present invention.
Figure 7:
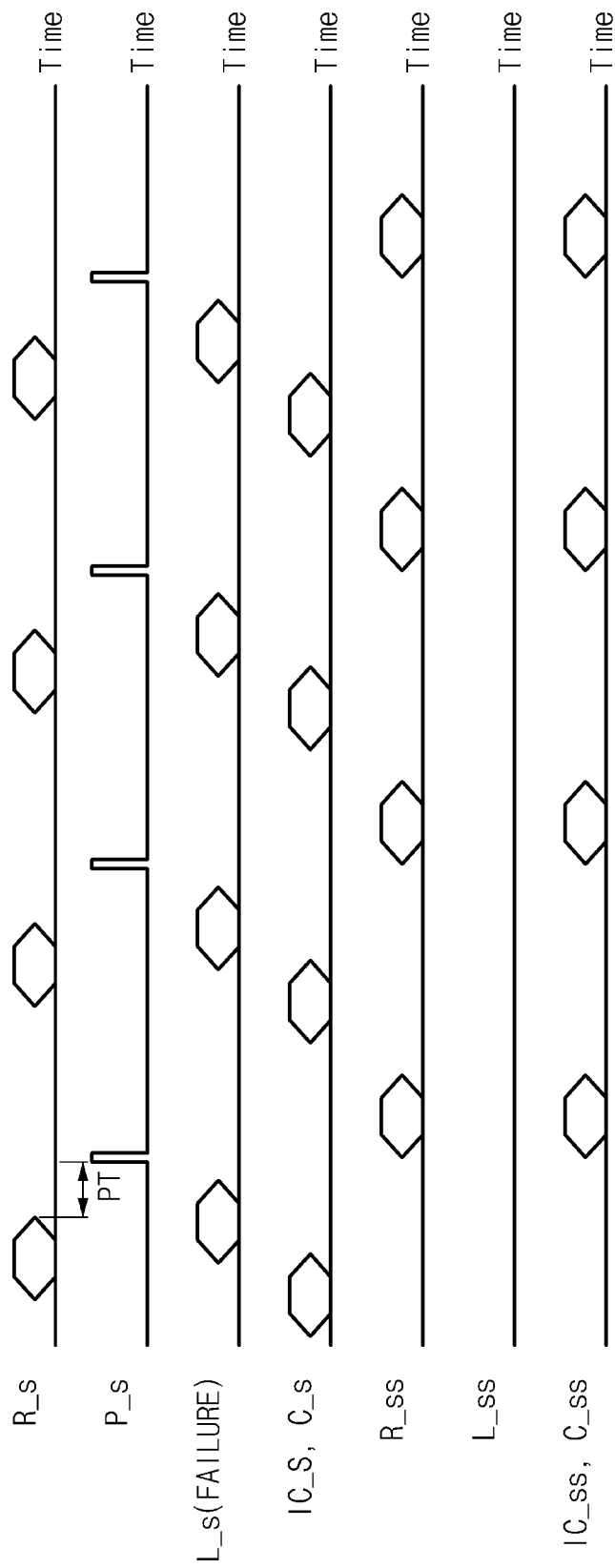
Figure 8:
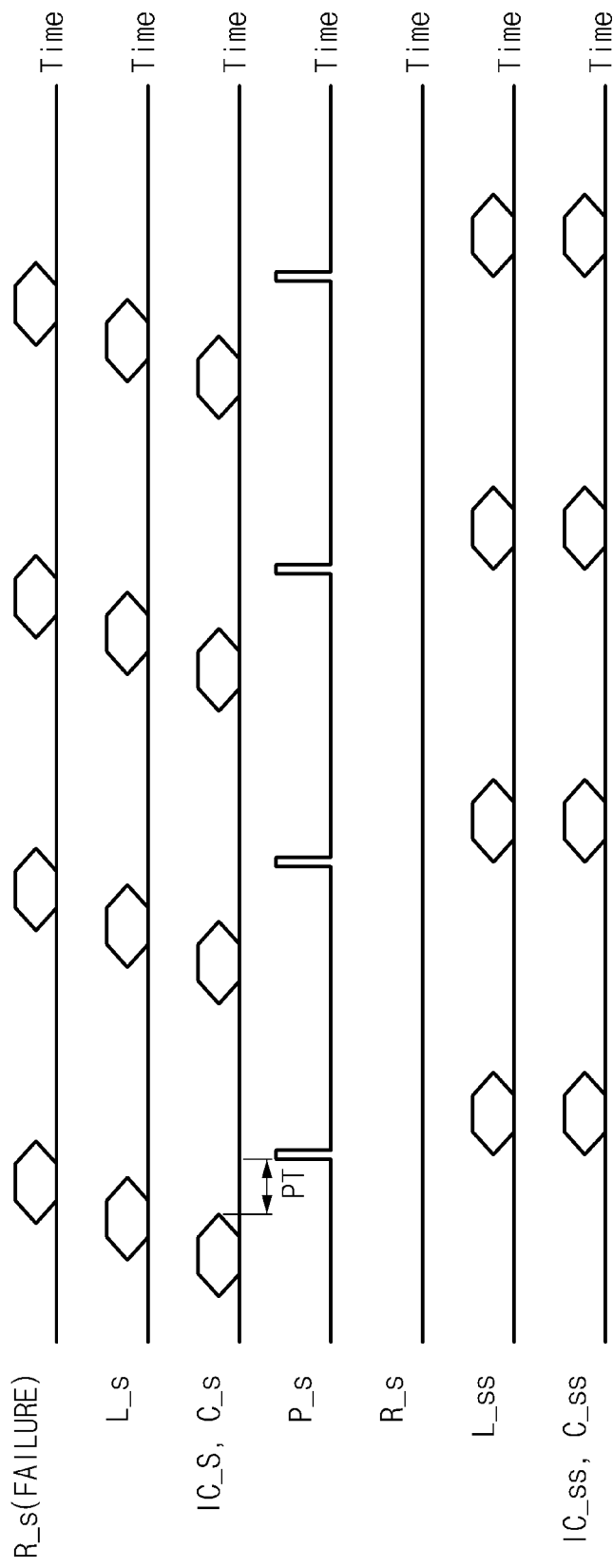

FIG. 6 to FIG. 8 are timing diagrams for explaining an operation of an automotive sensor integration module 100 according to an exemplary embodiment of the present invention. Here, FIGS. 6 to 8 are timing diagrams in which the detection data C_s, IC_s, R_s, and L_s respectively from the optical camera 11, the infrared camera 12, the radar 13, and the lidar 14 shown in FIG. 3 are input to and stored in the signal processing unit 30, and output as the sensing data C_ss, R_ss, and L_ss.

The timing diagrams of the automotive sensor integration module 100 according to an exemplary embodiment of the present invention may be shown as in FIGS. 6 to 7 in which a case is exemplified in which the pieces of detection data of the optical camera 11, the infrared camera 12, the radar 13 and the lidar 14 are synchronized and output based on the sensing period of the radar 13 among the optical camera 11, the infrared camera 12, the radar 13 and the lidar 14.

FIG. 6 is a timing diagram in case in which the optical camera 11, the infrared camera 12, the radar 13 and the lidar 14 included in the automotive sensor integration module 100 according to an exemplary embodiment of the present invention are all normal. Here, when the optical camera 11, the infrared camera 12, the radar 13 and the lidar 14 are all normal, the automotive sensor integration module 100 according to an exemplary embodiment of the present invention may substantially simultaneously output the detection data C_s, IC_s, R_s, and L_s from the optical camera 11, the infrared camera 12, the radar 13 and the lidar 14 based on the sensing period of the radar 13.

With reference to FIG. 4, an operation of the automotive sensor integration module 100 according to an exemplary embodiment of the present invention is as follows.

The signal processing unit 30 provided in the automotive sensor integration module 100 may include the malfunction detection unit 31, the reference selection unit 32, the synchronization pulse generation unit 33, and the output synchronization unit 38, and, as described above, the output synchronization unit 38 may include the first-to-fourth synchronous output unit 34, 35, 36, and 37.

The malfunction detection unit 31 may receive the first-to-fourth pieces of detection data C_s, IC_s, R_s, and L_s output from the optical camera 11, the infrared camera 12, the radar 13, and the lidar 14, and output the failure codes M_s<0:3>. Here, when the optical camera 11, the infrared camera 12, the radar 13, and the lidar 14 are all normal, the malfunction detection unit 31 may output all of first-to-fourth failure signals M_s<0>, M_s<1>, M_s<2>, and M_s<3> included in the failure codes M_s<0:3> at a digital logic low level.

The reference signal selection unit 32 may output, as a reference signal Ref_s, any one among the first-to-fourth pieces of detection data C_s, IC_s, R_s, and L_s based on the failure codes M_s<0:3>. With reference to Table 1, when all the first-to-fourth failure signals M_s<0>, M_s<1>, M_s<2>, M_s<3> are at a digital logic low level, the reference signal selection unit 32 may output, as the reference signal Ref_s, the third detection data R_s among pieces of the first-to-fourth detection data C_s, IC_s, R_s and L_s.

If the reference signal Ref_s, namely, the third detection data R_s is input and a preset time PTelapses, the synchronization pulse generation unit 33 may generate and output the synchronization pulse P_s.

Accordingly, as shown in FIG. 6, the synchronization pulse P_s is generated every time the third detection data R_s is input, as the reference signal Ref_s, to the synchronization pulse generation unit 31 of the signal processing unit 30 and the preset time PT elapses.

The first detection data C_s, the second detection, the third detection data R_s, and the fourth detection data L_s output from the infrared camera 12, the radar 13, and the lidar 14 are respectively stored in the first synchronization output unit 34, the second synchronization output unit 35, the third synchronization output unit 36, and the fourth synchronization output unit 37.

The first synchronization output unit 34 may be activated by receiving the first failure signal M_s<0> at a digital logic low level. The activated first synchronous output unit 34 may receive and store the first detection data C_s, and output the stored first detection data C_s as the sensing data C_ss based on the synchronization pulse P_s.

The second synchronization output unit 35 may be activated by receiving the second failure signal M_s<1> at a digital logic low level. The activated second synchronous output unit 35 may receive and store the second detection data IC_s, and output the stored second detection data IC_s as the sensing data IC_ss based on the synchronization pulse P_s.

The third synchronization output unit 34 may be activated by receiving the third failure signal M_s<2> at a digital logic low level. The activated third synchronous output unit 36 may receive and store the third detection data R_s, and output the stored first detection data R_s as the sensing data R_ss based on the synchronization pulse P_s.

The fourth synchronization output unit 34 may be activated by receiving the fourth failure signal M_s<3> at a digital logic low level. The activated fourth synchronous output unit 37 may receive and store the fourth detection data L_s, and output the stored second detection data L_s as the sensing data L_ss based on the synchronization pulse P_s.

The first-to-fourth synchronous output unit 34, 35, 36, and 37 may restore the input data, and output the stored data as the sensing data C_ss, IC_ss, R_ss, and L_ss based on the synchronization pulse P_s.

Accordingly, as shown in FIG. 6, at a timing at which the synchronization pulse P_s is generated, the first-to-fourth synchronous output units 34, 35, 36 and 37 may substantially simultaneously output the stored detection data as the sensing data C_ss, IC_ss, R_ss, and L_ss.

The automotive sensor integration module 100 according to an exemplary embodiment of the present invention may store the first-to-fourth detection data C_s, IC_s, R_s and L_s, and the detection data C_s, IC_s, R_s, and L_s may be substantially simultaneously output based on any one piece (the third detection data R_s in FIG. 6) of the first-to-fourth detection data C_s, IC_s, R_s and L_s.

The automotive sensor integration module 100 according to the present invention may include a plurality of sensors of which sensing periods and output data formats are different from each other, convert the output data format of each sensor into a specific data format (as an exemplary embodiment, a single data format), synchronize pieces of data detected by the plurality of sensors on the basis of the sensing period of one of the plurality of sensors, and output the synchronized data.

FIG. 7 is a timing diagram for explaining an operation in case in which the lidar 14 among the optical camera 11, the infrared camera 12, the radar 13 and the lidar 14 included in the automotive sensor integration module 100 malfunctions or fails.

The malfunction detection unit 31 may receive the first-to-fourth pieces of detection data C_s, IC_s, R_s, and L_s output from the optical camera 11, the infrared camera 12, the radar 13, and the lidar 14 and output the failure codes M_s<0:3>.

Here, if the lidar 14 among the optical camera 11, the infrared camera 12, the radar 13 and the lidar 14 is determined as malfunctioning or failing, the malfunction detection unit 31 may output, as a digital logic low level, other failure signals M_s<0>, M_s<1> and M_s<2> other than the fourth failure signal M_s<3> among the first-to-fourth failure signals M_s<0>, M_s<1>, M_s<2> and M_s<3> included in the failure codes M_s<0:3>, and output only the fourth failure signal at a digital logic high level.

The reference signal selection unit 32 may output, as a reference signal Ref_s, any one among the first-to-fourth pieces of detection data C_s, IC_s, R_s, and L_s based on the failure codes M_s<0:3>. With reference to Table 1, if only the fourth failure signal M_s<3> is at the digital logic high level among the first-to-fourth failure signals M_s<0>, M_s<1>, M_s<2>, and M_s<3>, the reference signal selection unit 32 may output, as the reference signal Ref_s, the third detection data R_s among pieces of the first-to-fourth detection data C_s, IC_s, R_s and L_s.

If the reference signal Ref_s, namely, the third detection data R_s is input and a preset time PT elapses, the synchronization pulse generation unit 33 may generate and output the synchronization pulse P_s.

Accordingly, as shown in FIG. 7, the synchronization pulse P_s is generated every time the third detection data R_s is input as the reference signal Ref_s to the synchronization pulse generation unit 31 of the signal processing unit 30 and the preset time PT elapses.

The first synchronization output unit 34 may be activated by receiving the first failure signal M_s<0> at a digital logic low level. The activated first synchronous output unit 34 may receive and store the first detection data C_s, and output the stored first detection data C_s as the sensing data C_ss based on the synchronization pulse P_s.

The second synchronization output unit 35 may be activated by receiving the second failure signal M_s<1> at a digital logic low level. The activated second synchronous output unit 35 may receive and store the second detection data IC_s, and output the stored second detection data IC_s as the sensing data IC_ss based on the synchronization pulse P_s.

The third synchronization output unit 34 may be activated by receiving the third failure signal M_s<2> at a digital logic low level. The activated third synchronous output unit 36 may receive and store the third detection data C_s, and output the stored first detection data C_s as the sensing data C_ss based on the synchronization pulse P_s.

The fourth synchronous output unit 37 may be deactivated by receiving the fourth failure signal M_s<3> at a digital logic high level. The deactivated fourth synchronous output unit 37 may be blocked from receiving and storing the fourth detection data L_s, and from outputting the sensing data L_ss.

Only the first-to-third synchronous output units 34, 35 and 37 among the first-to-fourth synchronous output units 34, 35, 36 and 37 may store input detection data, and output, as the sensing data C_ss, R_ss, and IC_ss, the data stored based on the synchronization pulse P_s.

Accordingly, as shown in FIG. 7, at a timing at which the synchronization pulse P_s is generated, only the first-to-third synchronous output units 34, 35 and 36 among the first-to-fourth synchronous output units 34, 35, 34, 35, 36 and 37 may substantially simultaneously output the stored detection data as the sensing data C_ss, IC_ss, and R_ss.

The automotive sensor integration module 100 according an exemplary embodiment of the present invention may detect a sensor or a device in which a malfunction or failure occurs among the optical camera 11, the infrared camera 12, the radar 13 and the lidar 14, store detection data output from the remaining sensors or devices other than the sensor or device in which the malfunction or failure occurs, and substantially simultaneously output, as sensing data, the stored detection data based on the synchronization pulse P_s.

Therefore, the automotive sensor integration module 100 according to an exemplary embodiment of the present invention may block an output from the sensor or device in which the malfunction or failure occurs.

FIG. 8 is a timing diagram for explaining an operation in case in which the lidar 14 among the optical camera 11, the infrared camera 12, the radar 13, and the lidar 14 included in the automotive sensor integration module 100 malfunctions or fails. Here, FIG. 8 illustrates a case where a malfunction or a failure occurs in the radar 13 that is a reference for an output timing of the sensing data output to the outside by the automotive sensor integration module 100 10 according to an exemplary embodiment of the present invention.

The malfunction detection unit 31 may receive the first-to-fourth pieces of detection data C_s, IC_s, R_s, and L_s output from the optical camera 11, the infrared camera 12, the radar 13, and the lidar 14, and output the failure codes M_s<0:3>.

Here, if the radar 13 among the optical camera 11, the infrared camera 12, the radar 13, and the lidar 14 is determined as malfunctioning or failing, the malfunction detection unit 31 may output, at a digital logic low level, other failure signals M_s<0>, M_s<1> and M_s<3> other than the third failure signal M_s<2> among the first-to-fourth failure signals M_s<0>, M_s<1>, M_s<2> and M_s<3> included in the failure codes M_s<0:3>, and may output only the third failure signal M_S<2> at a digital logic high level.

The reference signal selection unit 32 may select and output, as the reference signal Ref_s, any one among the first-to-fourth pieces of detection data C_s, IC_s, R_s, and L_s based on the failure codes M_s<0:3>. With reference to Table 1, if only the third failure signal M_s<2> is at the digital logic high level among the first-to-fourth failure signals M_s<0>, M_s<1>, M_s<2>, and M_s<3>, the reference signal selection unit 32 may output, as the reference signal Ref_s, the first detection data C_s among pieces of the first-to-fourth detection data C_s, IC_s, R_s, and L_s.

If the reference signal Ref_s, namely, the first detection data C_s is input and a preset time PT elapses, the synchronization pulse generation unit 33 may generate and output the synchronization pulse P_s.

Accordingly, as shown in FIG. 8, the synchronization pulse P_s is generated every time the first detection data C_s is input as the reference signal Ref_s to the synchronization pulse generation unit 31 of the signal processing unit 30 and the preset time PT elapses.

The first synchronization output unit 34 may be activated by receiving the first failure signal M_s<0> at a digital logic low level. The activated first synchronous output unit 34 may receive and store the first detection data C_s, and output the stored first detection data C_s as the sensing data C_ss based on the synchronization pulse P_s.

The second synchronization output unit 35 may be activated by receiving the second failure signal M_s<1> at a digital logic low level. The activated second synchronous output unit 35 may receive and store the second detection data IC_s, and output the stored second detection data IC_s as the sensing data IC_ss based on the synchronization pulse P_s.

The third synchronous output unit 36 may be deactivated by receiving the third failure signal M_s<2> at a digital logic high level. The deactivated third synchronization output unit 36 may be blocked from receiving and storing the third detection data R_s and from outputting the sensing data R_ss.

The fourth synchronization output unit 34 may be activated by receiving the fourth failure signal M_s<3> at a digital logic low level. The activated first synchronous output unit 37 may receive and store the fourth detection data L_s, and output the stored fourth detection data L_s as the sensing data L_ss based on the synchronization pulse P_s.

The synchronous output units 34, 35 and 37 other than the third synchronous output unit 36 among the first-to-fourth synchronous output units 34, 35, 36, and 37 may store received detection data and output, as the sensing data C_ss, IC_ss, and L_ss, the stored data based on the synchronization pulse P_s.

The automotive sensor integration module 100 according to an exemplary embodiment of the present invention may synchronize the pieces of detection data C_s, IC_s, R_s, and L_s acquired from the optical camera 11, the infrared camera 12, the radar 13, and the lidar 14 based on the sensing period of any one among the optical camera 11, the infrared camera 12, the radar 13, and the lidar 14, and output the synchronized detection data as the sensing data.

In addition, in the automotive sensor integration module 100 according to an exemplary embodiment of the present invention, if a malfunction or a failure occurs in at least one or more among the optical camera 11, the infrared camera 12, the radar 13, and the lidar 14, a sensor or device for determining an output timing of the sensing data may be changed into another sensor or device according to a preset priority.

Accordingly, in the automotive sensor integration module 100 according to an exemplary embodiment of the present invention, even when a malfunction or failure occurs in the plurality of mounted sensors, outputs from the remaining normally operating sensors are synchronized and output based on the sensing period of one among the normally operating sensors according the preset priority.

The automotive sensor integration module 100 according to an embodiment of the present invention may improve the performance of detecting an object outside the vehicle by blocking an output from a sensor or device in which the malfunction or failure occurs.

Accordingly, an ADAS or an autonomous traveling vehicle to which an automotive sensor integration module 100 according to the present invention is applied is advantageous in determining an object than an ADAS or an autonomous traveling vehicle in which sensors are separately arranged at different positions.

Since a plurality of sensors are synchronously operated in the automotive sensor integration module 100 according to the exemplary embodiments of the present invention, there is an effect of improving the performance for detecting an object outside a vehicle.

Although the present invention has been described with reference to the drawings exemplified as above, the present invention is not limited to the embodiments and drawings disclosed herein, and it would be obvious that various modifications may be made by those skilled in the art within the scope of the technical spirit of the present invention. Furthermore, it is apparent that, although the effects brought about by the configuration of the present invention are not clearly mentioned while describing the embodiments of the present invention, any effect, which can be predicted from the configuration, can also be acknowledged.

What is claimed is:

1. An automotive sensor integration module comprising:
   a plurality of sensors differing from each other in at least one of a sensing period or an output data format; and
   a signal processor configured to synchronize, in response to a malfunctioning sensor being detected from among the plurality of sensors, pieces of detection data output from remaining sensors other than the detected sensor to substantially simultaneously output the synchronized data as sensing data,
   wherein:
   the signal processor determines whether the pieces of detection data output from the plurality of sensors are input for respective sensing periods of the respective sensors to detect the malfunctioning sensor among the plurality of sensors; and
   the signal processor comprises:
   a malfunction detection unit configured to determine whether the pieces of detection data output from the plurality of sensors are input for the respective sensing periods of the respective sensors to generate failure codes;
   a reference signal selection unit configured to select one among the pieces of detection data output from the plurality of sensors based on the preset priority and the failure codes, and output the selected detection data as a reference signal;
   a synchronization pulse generation unit configured to generate a synchronization pulse based on the reference signal; and
   an output synchronization unit configured to select the pieces of detection data output from the plurality of sensors based on the failure codes and the synchronization pulse, and output the pieces of selected detection data as the sensing data.

2. The automotive sensor integration module of claim 1, wherein the malfunction detection unit generates the failure codes comprising a first level failure signal indicating that the detection data is input at a sensing period of a corresponding sensor with respect to each of the plurality of sensors, and a second level failure signal indicating that the detection data is not input at the sensing period of the corresponding sensor.

3. The automotive sensor integration module of claim 2, wherein the reference signal selection unit outputs, as the reference signal, one piece of detection data selected according to the preset priority from among the pieces of detection data corresponding to the first level failure signal.

4. The automotive sensor integration module of claim 3, wherein:
the output synchronization unit comprises a plurality of synchronization output units configured to receive the respective pieces of detection data output from the plurality of sensors; and
each of the plurality of synchronous output units receives and stores corresponding detection data, when the first level failure signal is input, and outputs the stored detection data based on the synchronization pulse as the sensing data, blocks the corresponding detection data from being received and stored when the second level failure signal is input, and blocks the corresponding detection data from being output as the sensing data.

5. An automotive sensor integration module comprising:
a plurality of sensors comprising at least one or more among an optical camera, an infrared camera, a radar and a lidar; and
a signal processor configured to synchronize pieces of detection data input for each sensing period of the plurality of sensors with any one piece among the pieces of detection data, and output the synchronized data as sensing data,
wherein:
the signal processor generates a first level failure signal corresponding to the pieces of detection data input for each sensing period of the plurality of sensors; and
generates a second level failure signal corresponding to pieces of detection data that are not received at each sensing period of the plurality of sensors.

6. The automotive sensor integration module of claim 5, wherein the signal processor generates a synchronization pulse based on any one piece among the pieces of detection data corresponding to the first level failure signal.

7. The automotive sensor integration module of claim 6, wherein the signal processor receives and stores the pieces of detection data corresponding to the first level failure signal, and outputs, as the sensing data, the stored pieces of detection data based on the synchronization pulse.

8. The automotive sensor integration module of claim 7, wherein the signal processor comprises:
a malfunction detection unit configured to determine whether the pieces of detection data output from the plurality of sensors are received for each sensing period of the plurality of sensors to generate the failure signal corresponding to each sensor;
a reference signal selection unit configured to output, as a reference signal, one piece among the pieces of detection data output from the plurality of sensors based on the failure signal;
a synchronization pulse generation unit configured to generate the synchronization pulse based on the reference signal; and
a plurality of synchronous output units configured to receive and store the respective pieces of detection data output from the plurality of sensors based on the failure signal, and output, as the sensing data, the stored detection data based on the synchronization pulse.

9. The automotive sensor integration module of claim 8, wherein each of the plurality of synchronous output units receives and stores corresponding detection data, if activated based on the failure signal, and outputs, as the sensing data, the stored detection data based on the synchronization pulse, and blocks the corresponding detection data from being received and stored, if deactivated based on the failure signal, and blocks the sensing data from being output.

* * * * *